United States Patent
Lesch et al.

(10) Patent No.: US 6,773,694 B1
(45) Date of Patent: Aug. 10, 2004

(54) PROCESS FOR SYNTHESIZING MOLECULAR SIEVES

(75) Inventors: David A. Lesch, Hoffman Estates, IL (US); Peter K. Coughlin, Mundelein, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/164,643

(22) Filed: Jun. 6, 2002

Related U.S. Application Data

(63) Continuation-in-part of application No. 09/469,701, filed on Dec. 22, 1999, now abandoned.

(51) Int. Cl.[7] .......................... C01B 37/08; C01B 39/02
(52) U.S. Cl. ................. 423/709; 423/306; 423/DIG. 30
(58) Field of Search ................................ 423/700, 709, 423/306, DIG. 30; 502/208, 214

(56) References Cited

U.S. PATENT DOCUMENTS

| | | | |
|---|---|---|---|
| 3,425,800 A | | 2/1969 | Hirsh |
| 4,061,724 A | | 12/1977 | Grose et al. ................. 423/335 |
| 4,112,056 A | * | 9/1978 | Chen et al. .................. 423/704 |
| 4,203,869 A | * | 5/1980 | Rollmann .................... 502/69 |
| 4,310,440 A | | 1/1982 | Wilson et al. |
| 4,314,979 A | | 2/1982 | Deabriges |
| 4,385,042 A | * | 5/1983 | Whitehurst et al. ......... 423/711 |
| 4,394,362 A | * | 7/1983 | Miller .......................... 423/709 |
| 4,440,871 A | | 4/1984 | Lok et al. |
| 4,500,651 A | | 2/1985 | Lok et al. .................... 502/208 |
| 4,818,509 A | * | 4/1989 | Dwyer et al. ................ 423/709 |
| 5,370,859 A | * | 12/1994 | MacLaine-Cross ......... 423/709 |
| 5,389,358 A | | 2/1995 | Wu et al. .................... 423/718 |

OTHER PUBLICATIONS

Cundy, C.S., Henty, M.S. and Plaisted, R.J., *Zeolite Synthesis Using a Semicontinuous Reactor, Part 2: Synthesis at High Nucleation rates*, zeolites 15: 400–407, 1995.

Cundy, C.S., Henty, M.S. and Plaisted, R.J., *Zeolite Synthesis Using a Semmicontinuous Reactor, Part 1: Controlled nucleation and growth of ZSM–5 crystals having well–defined morphologies*, Zeolites 15: 353–372, 1995.

* cited by examiner

*Primary Examiner*—David Sample
(74) *Attorney, Agent, or Firm*—John G. Tolomei; Frank S. Molinaro

(57) ABSTRACT

A process for synthesizing a variety of molecular sieves has been developed. The process involves taking a slurry of seed crystals and adding to it nutrients (sources) of the framework elements, e.g. aluminum and silicon in order to grow the seed crystals. The rate of addition of the nutrients is controlled such that it is substantially the same as the crystal growth rate and such that there is substantially no nucleation of new crystals. The seed crystals may be the same or different than the nutrients being added, thus allowing for a layered molecular sieve. When the crystals have reached a desired size, they are isolated by conventional techniques.

42 Claims, No Drawings

PROCESS FOR SYNTHESIZING MOLECULAR SIEVES

CROSS-REFERENCE TO RELATED APPLICATION

This application is a continuation-in-part of copending application Ser. No. 09/469,701 filed on Dec. 22. 1999, now abandoned which is hereby incorporated by reference in its entirety.

FIELD OF THE INVENTION

This invention relates to a process for synthesizing molecular sieves. More specifically, the process involves adding nutrients (sources) of the framework elements, e.g., aluminum and silicon to a slurry of seed crystals of the molecular sieve. The rate of addition of the nutrients is controlled so that it is substantially the same as the crystal growth rate.

BACKGROUND OF THE INVENTION

Molecular sieves of the crystalline aluminosilicate zeolite type are well known in the art, and now comprise over 150 species of both naturally occurring and synthetic zeolites. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion exchange and/or adsorption characteristics of the zeolites. These include: 1) a pure silica polymorph, silicalite, having a neutral framework containing neither cations nor cation sites as disclosed in U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871 and 4) titanium substituted aluminophosphates as disclosed in U.S. Pat. No. 4,500,651.

Molecular sieves are usually hydrothermally synthesized from a reaction mixture in a batch reactor. In this type of process, all ingredients are added to a reactor thereby forming a gel. The gel is next stirred and heated for a sufficient time to crystallize the zeolite. The drawbacks to a conventional process include limitations on the control of size and morphology of crystals, limitations on the solids content, generation of waste products which can't be recycled and large capital investments. Accordingly, the industry is continuously conducting research to improve the manufacture of molecular sieves.

For example, U.S. Pat. No. 4,314,979 discloses a continuous process for preparing zeolite A. The process involves mixing solutions containing aluminum and silicon and flowing the mixture to a crystallization reactor to crystallize zeolite A. U.S. Pat. No. 5,389,358 discloses a process for synthesizing zeolites by first nucleating crystals and then adding solutions which contain the reactants followed by aging in order to crystallize the zeolite. Finally, U.S. Pat. No. 3,425,800 describes a continuous process for synthesizing zeolite A or X in which aqueous solutions of the reactants are mixed to form a gel, the gel is heated and then supplied to a stratified crystallization zone where the crystals form.

C. S. Cundy et al., in *Zeolites*, Vol. 15, 353–372 (1995), discloses a process for synthesizing the zeolite ZSM-5. The process involves filling a reactor with a slurry of seed crystals in a suitable liquid. To this mixture there are continuously added sources of aluminum and silicon with intermittent removal of product such that the reactor is filled to a constant level. In a second article by the same authors (*Zeolites*, Vol. 15, 400–407 (1995) it is disclosed that when aluminum and silicon are added at a faster rate than crystal growth, a high nucleation rate is observed.

In contrast to these references, applicants have developed a process in which seed crystals are grown to a desired size. The process involves adding to a slurry of seed crystals nutrients which are sources of the framework elements, e.g., Al, Si, of the molecular sieve. Nutrients are added at a rate which essentially equals the crystal growth rate, such that no gel is formed and there is substantially no nucleation of new crystals. The nutrients can provide framework elements different from the framework elements of the seed crystals but which produce the same framework structure as the seed crystals. Mixing of the slurry is controlled such that either single crystals or agglomerates are obtained. The addition of nutrients is carried out until the desired crystal size or particle size is obtained at which point the molecular sieve is separated from the liquid by conventional means.

SUMMARY OF THE INVENTION

As stated, this invention relates to a process for the synthesis of molecular sieves. Accordingly, one embodiment of the invention is a process for synthesizing a molecular sieve having a three-dimensional microporous framework structure and a framework composition represented by an empirical formula of $$(Al_xSi_{1-x})O_2$$

where Al and Si are framework elements present as tetrahedral oxide units, x has a value from 0 to about 0.5; the process comprising providing a slurry of seed crystals at reaction conditions; adding to the slurry nutrients, to provide framework elements of the seed crystals thereby growing the seed crystals; carrying out the addition at a rate that essentially equals the crystal growth rate and for a time sufficient to produce the molecular sieve.

Another embodiment of the invention is to use the process described in the previous paragraph to prepare a molecular sieve represented by an empirical formula of:

$$(El_wAl_xP_{y'}Si_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1.

Yet another embodiment of the invention is a process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(Al_xSi_{1-x})O_2$$

where Al and Si are framework elements, present as tetrahedral oxide units, and x has a value from 0 to about 0.5; the process comprising providing a slurry of crystals of the core molecular sieve at reaction conditions; adding to the slurry nutrients to provide framework elements, thereby growing an outer molecular sieve over the crystals, the outer molecular sieve having the same framework structure as the core molecular sieve but the core and outer molecular sieve differing by at least one framework element, the outer molecular sieve having a composition represented by the empirical formula:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value of 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

A further embodiment of the invention is a process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising providing a slurry of crystals of the core molecular sieve at reaction conditions; adding to the slurry nutrients to provide framework elements thereby growing an outer molecular sieve over the crystals, the outer molecular sieve having the same framework structure as the core molecular sieve but the core and outer molecular sieve differing by at least a one framework element, the outer molecular sieve having a composition represented by the empirical formula:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

These and other objects, embodiments and details of this invention will become apparent after a detailed description of the invention.

DETAILED DESCRIPTION OF THE INVENTION

The process of the present invention relates to growing molecular sieve crystals from seed crystals with essentially no nucleation of new crystals. In one embodiment of the invention, the same molecular sieve as the seeds, i.e. same framework elements and structure but not necessarily the same ratio of those elements, will grow around the seed crystals. In another embodiment, the molecular sieve grown around the seed crystals will have the same framework structure, but not the same framework elements, i.e. at least one element will be different.

Accordingly, one essential element of the present invention is a molecular sieve seed crystal. Molecular sieves are microporous compositions with a three dimensional framework which have crystallographically uniform pores. These sieves are classified as either zeolitic or non-zeolitic molecular sieves. Zeolites are alumino-silicate compositions in which the framework structure is composed of $SiO_2$ and $AlO_2$ tetrahedral oxides. Non-zeolitic molecular sieves are those which contain elements other than aluminum and silicon. Examples include silicoalumino-phosphates and aluminophosphate molecular sieves. The zeolitic and non-zeolitic molecular sieves which can be prepared using the process of the present invention have a three dimensional framework structure and a framework composition represented by the general empirical formula:

$$(El_wAl_xP_ySi_z)O_2 \qquad (I)$$

where El is an element capable of forming a three-dimensional framework oxide unit as described below, and P, Al and Si are also framework elements present as tetrahedral oxide units. The mole fraction of El is represented by "w" and has a value from zero to about 0.5, "x" is the mole fraction of Al and has a value from 0 to about 0.5, "y" is the mole fraction of P and has a value from 0 to about 0.5 and "z" is the mole fraction of Si and has a value from 0 to about 1, w+x+y+z=1 and "y" and "z" are not simultaneously zero. When "El" comprises two or more elements, "w" represents the mole fraction of said elements ($El_1$, $El_2$, $El_3$, $El_4$ etc.) and "w" equals the sum of "$w_1$", "$w_2$", "$w_3$", "$w_4$", etc. which represents, respectively, the mole fractions of $El_1$, $El_2$, $El_3$, $El_4$ etc. These molecular sieves have been given the acronym ElAPSO and are described in detail in U.S. Pat. No. 4,793,984 which is incorporated in its entirety by reference. The criteria for selecting the El element is also presented in the '984 patent. The El is characterized by at least one of the following criteria:

1) "El" is characterized by an electronic orbital configuration selected from the group consisting of $d^0$, $d^1$, $d^2$, $d^5$, $d^6$, $d^7$, or $d^{10}$ where the small crystal field stabilization energy of the metal ligand "—O—El" favors tetrahedral coordination of element El with $O^{2-}$, as discussed in "Inorganic Chemistry" J. E. Huheey, Harper Row, p. 348 (1978):

2) "El" is characterized as capable of forming stable oxo or hydroxo species in aqueous solutions as evidenced by a first hydrolysis constant, $K_{11}$, greater than $10^{-14}$, as discussed in "The Hydrolysis of Cations", C. F. Baes and R. E. Mesmer, John Wiley & Sons (1976);

3) "El" is selected from the group of elements known to occur in crystal structure types geometrically related to the different silica modifications, quartz, cristobalite or tridymite, as discussed in E. Parthe, "Crystal Chemistry of Tetrahedral Structures", Gordon and Breach, New York, London, pp. 66–68 (1964); and 4) "El" is an element, which in its cation form is classified by Pearson. (J. E. Huheey, "Inorganic Chemistry", Harper & Row, p. 276 (1978) as "hard" or "borderline" acids which interact with the "hard" base $O^{2-}$ to form more stable bonds than the cations classified as "soft" acids. Specific elements include but are not limited to arsenic, beryllium, boron, chromium, cobalt, nickel, gallium, germanium, iron, lithium, magnesium, manganese, titanium, vanadium, tin and zinc.

From the general formula described above, several classes of molecular sieves can be described and prepared. For example, when "w" and "y" are both zero, the molecular sieves are zeolites or zeolitic molecular sieves. In this case formula (I) becomes

$$(Al_xSi_{1-x})O_2 \quad (II)$$

where x has a value from 0 to about 0.5. Specific examples of the zeolites which can be prepared by the present invention include but are not limited to zeolite A, zeolite X, mordenite, silicalite, zeolite beta, zeolite Y, zeolite L, ZSM-12, UZM-4 and UZM-5. UZM-4 and UZM-5 are described in WO 02/36491 and WO 02/36489 respectively which are incorporated in their entirety by reference. When x is zero, the zeolite is silicalite. In the case where "x" in formula (I) is greater than zero one obtains formula (III)

$$(El_wAl_{x'}P_ySi_z)O_2 \quad (III)$$

where "w", "y" and "z" are defined as in formula (I) and x' has a value from greater than 0 to about 0.5. Further, when "w" and "z" are zero in formula (III) or when "w" and "z" are zero and "x" is greater than 0 in formula (I), one obtains the ALPO family of non-zeolitic molecular sieves which are described in detail in U.S. Pat. Nos. 4,310,440 and 4,500,651, both of which are incorporated in their entirety by reference. Further, when "w" is zero and "z" is greater than zero in formula (I) or (III) (and "x" is greater than zero in formula (I)) then one obtains the SAPO family of non-zeolitic molecular sieves non-limiting examples of which are SAPO-34 and SAPO-11 which are described in U.S. Pat. No. 4,440,871 which is incorporated in its entirety by reference. When "z" is zero and all other subscripts in either formula (I) or (III) are greater than zero, one has the ElAPO family of non-zeolitic molecular sieves. Finally, when all subscripts in formula (I) or (III) are greater than zero, one has the ElAPSO family of non-zeolitic molecular sieves described above, one example of which is MAPSO-31.

In addition to the framework elements, the molecular sieves in the assynthesized and anhydrous state will contain in their pores some of the templating agent which was used to prepare the molecular sieve. These templating agents are well known in the art and include but are not limited to alkali metals, alkaline earth metals and organic compounds. The organic compounds are any of those well known in the art and include but are not limited to amines such as piperdine, tripropylamine, dipropylamine, diethanolamine, triethanolamine, cyclohexylamine and quaternary ammonium compounds such as the halide or hydroxide compound of tetramethylammonium, tetrabutyl ammonium, tetraethylammonium and tetrapropylammonium ions.

The seed crystals of any of the molecular sieves described above can be prepared by conventional methods, described in the patents cited and incorporated above, which involve mixing sources of the reactants, e.g. aluminum source, silicon source and templating structure directing agent in a vessel and heating to a temperature is (with or without pressure) until crystalline product is obtained. The sources of aluminum include aluminum alkoxide, pseudoboehmite, gibbsite, colloidal alumina, alumina sol, sodium aluminate, aluminum trichloride and aluminum chlorohydrate. Of the above, preferred aluminum sources are pseudoboehmite, sodium aluminate and aluminum alkoxides such as aluminum isoproxide. Silicon sources include silica sol, colloidal silica, fumed silica, silica gel, silicon alkoxides, silicic acid and alkali metal silicate such as sodium silicate. Phosphorus sources include phosphoric acid and organic phosphates such as triethylphosphate.

The element(s) "El" can be introduced into the reaction system in any form which permits the formation in situ of a reactive form of the element, i.e., reactive to form a framework oxide unit of element "El". Compounds of element(s) "El" which may be employed include oxides, hydroxides, alkoxides, nitrates, sulfates, halides, carboxylates, and mixtures thereof. Representative compounds which may be employed include without limitation: carboxylates of arsenic and beryllium; cobalt chloride hexahydrate, alpha cobaltous iodide; cobaltous sulfate; cobalt acetate; cobaltous bromide; cobaltous chloride; boron alkoxides; chromium acetate; gallium alkoxides; zinc acetate; zinc bromide; zinc formate; zinc iodide; zinc sulfate heptahydrate; germanium dioxide; iron (II) acetate; lithium acetate; magnesium acetate; magnesium bromide; magnesium chloride; magnesium iodide; magnesium nitrate; magnesium sulfate; manganese acetate; manganese bromide; manganese sulfate; titanium tetrachloride; titanium carboxylates; titanium acetate; zinc acetate; tin chloride; and the like. As stated above, sources of templating agents/structure directing agents are also added, e.g. sodium hydroxide, tetramethyl ammonium chloride as well as sufficient water to obtain a workable mixture.

The seed crystals of the desired molecular sieve are collected and slurried in water (at the appropriate pH). However, it is preferred that the seed crystals be dispersed in a mixture (aqueous) which contains all the reactants necessary to prepare the desired molecular sieve, but which are at a concentration less than the critical supersaturation concentration. It is most preferred that the mixture contain the reactants or nutrients at their equilibrium saturation level. One especially preferred mixture is the aqueous phase which is obtained at the end of the instant process after the desired molecular sieve is filtered. It is envisioned that this aqueous phase can be recycled a number of times and reused to prepare molecular sieves. To this slurry sources of the desired framework elements, hereinafter referred to as nutrients, are added to grow a molecular sieve on the seed crystals. Thus the nutrient or combination of nutrients which are added are any of those which can form a molecular sieve. These combinations are: 1) silicon source; 2) aluminum and silicon sources, 3) aluminum, phosphorus and silicon sources; 4) aluminum and phosphorus sources; 5) El, aluminum and phosphorus sources; and 6) El, aluminum, silicon and phosphorus sources. It should also be pointed out that additional templating agent/structure directing agent may need to be added. This can be done by adding the desired source of the agent with one of the nutrients or as a separate stream. Additionally the initial seed slurry can contain an excess of the desired agent.

The nutrients which are added can be those which will provide the same molecular sieve as the seed crystal or a different molecular sieve. Even if the same molecular sieve is formed, the ratio of nutrients and thus the ratio of framework elements can vary between the seed crystals and the molecular sieve subsequently grown on the seed crystals. For example, as set forth in the examples, to seed crystals of zeolite X at a Si/Al of 2.5 there can be added silicon and aluminum nutrients at concentrations to grow zeolite X on the seed crystals, but at a Si/Al of 2.0.

In the case where the seed crystals and the molecular sieve grown on the seed crystals have different framework elements, it is necessary that the seed crystal or core molecular sieve and the outer molecular sieve have the same framework structure. It is only necessary that the core and outer molecular sieve differ by at least one framework element. For example, the core molecular sieve can be ALPO-34 and the outer molecular sieve can be SAPO-34, chabazite, CoAPO-44, LZ-218, GaAPO-34, zeolite Phi, etc. The molecular sieves which have the same structure can be determined by consulting W. M. Meier, D. H. Olson and Ch. Baulocher, *Atlas of zeolite Structure Types*, Fifth Revised Edition, Elsevier, Amsterdam, 2001 or Ch. Baulocher and L. B. McCusker, Database of Zeolite Structures, http://www.iza-structure.org/databases/.

It can be seen from the foregoing that one can prepare a molecular sieve which has numerous layers of different composition. In this case, the core molecular sieve would be made up of several layers with the final layer being the outer molecular sieve. By using the instant process, one can also produce a molecular sieve having the same framework elements throughout the crystal, but have layers of different ratios of framework elements, e.g. Si/Al ratio. Thus, one can start with a ZSM-5 core, increase the Si/Al ratio in steps in the next layers and finally have a silicalite layer as the outer layer.

Regardless of the choice of nutrients, they can be added by any convenient means. These means include preparing solutions of the nutrients, preparing solid suspensions or slurries, adding solids directly and adding neat nutrients. Of course one nutrient can be added by one method, while other nutrient(s) can be added by another method. Additionally, depending on the particular nutrient additional acid or base may need to be added to arrive at the desired pH. For example when sodium silicate is used as the nutrient or source of silicon, acid may need to be added to neutralize the sodium hydroxide which may be generated.

When more than one nutrient is added, e.g. Si and Al, they can be added simultaneously or sequentially. By using sequential addition, one need use only one pump in the case of liquids or slurries. Simultaneous addition can be carried out in one of two ways. First, each nutrient is fed into the reactor containing the seed slurry using individual ports or injectors. Second, the individual nutrients can be fed into a holding tank, mixed and then fed as one stream into the reactor containing the seed slurry. The latter method is preferred. Finally, the nutrients can be added continuously or intermittently. If intermittently, the addition can be at regular intervals or at irregular intervals. Whether added continuously or intermittently, it is necessary that the nutrients be added at a rate such that the seed or core crystals will grow without substantially any further nucleation of new crystals or the formation of amorphous solids. By "nucleation of new crystals" is meant the formation of crystals from the mixture when the concentration of the nutrients is above the critical supersaturation concentration. The growth of the seed crystals into larger crystals is not considered to be "nucleation of new crystals". In order to accomplish this the addition rate of the nutrients must be essentially the same as the crystal growth rate. One way to determine the addition rate is to first determine the crystal size of the seed crystals by methods such as Scanning Electron Microscopy (SEM). Next, it is assumed that the crystal growth (determined empirically) is uniform and linear and that the crystals are cubes. From this feed rates can be calculated.

Another way to control the amount of nutrients to be added is to keep the concentration of each nutrient above the saturation limit, but below the critical supersaturation limit. If the concentration is above the critical supersaturation limit, then nucleation of new crystals will begin, whereas if the concentration is at or below the saturation limit, then no growth occurs.

The reaction conditions for growing the crystals are the same as those used in conventional processes and include autogenous pressure and a temperature of about room temperature (20° C.) to about 250° C. Higher pressures can be used and usually can be as high as 300 psig. Addition of nutrients is continued until the desired crystal size is obtained. The size of the seed crystals can vary considerably and is not a critical parameter of this invention. Although any size seed crystal can be used, typically the seed crystallite size ranges from about 10 nanometers to about five micrometers. There is also no upper limit to the final crystallite size of the product, but crystallites as large as 10 micrometers could be formed. Once the desired crystal size is obtained, nutrient addition is stopped and the molecular sieve solid is separated from the aqueous phase or mother liquor by methods well known in the art such as filtration, centrifugation, etc.

While the crystal size is determined by the amount of the nutrients added, the crystals themselves can agglomerate or aggregate into particles. Thus, particles can be bigger than any one individual crystal. Control of the particle size, i.e., degree of agglomeration, is achieved by applying shear to the reaction mixture. Shear can be applied by mechanical means, hydraulic means etc. Specific methods of applying shear include but are not limited to stirrers, impellers, ultrasound, opposed jets, etc. These means are meant to break apart agglomerates but they can also break apart individual crystals which can grow further. The breakup of individual crystals is not nucleation.

Crystal size and/or particle size distribution can be controlled by adding more seed crystals during the process. This can be done once, intermittently or continuously throughout the process. Additionally, the seed crystals which are added later can be larger than the initial seed crystals, thus providing a narrow crystal and/or particle size distribution. Alternatively, the seed crystals which are added later can be smaller than the initial seed crystals, thus providing a broader crystal and/or particle size distribution.

The following examples are set forth to illustrate the invention. It is to be understood that the examples are only by way of illustration and are not intended as an undue limitation the broad scope of the invention as set forth in the appended claims.

EXAMPLE 1

Seed crystals of 2.5 NaX ($Si/Al_2=2.5$) were prepared and were found to have an average crystal size of 1.2 $\mu$m. To a 2 L vessel there were added 125 g of the 2.5 NaX seed crystals and 733 g of a 15 wt. % NaOH solution and the vessel heated to 70° C. with stirring. The contents of the vessel were continuously withdrawn from a port in the bottom of the vessel pumped at a rate of 5 L/min through opposed jets and returned to the vessel via a port at the top of the vessel. Aqueous solutions of sodium silicate (29 wt. % $SiO_2$ and 9 wt. % $Na_2O$) and sodium aluminate (24 wt. % $Al_2O_3$ and 20 wt. % $Na_2O$) were added to the vessel at continually increasing rates as shown in the following table.

| Time (hr) | Silicate feed rate (mL/hr) | Aluminate feed rate (mL/hr) |
|---|---|---|
| 0 | 64 | 65 |
| 1 | 88 | 89 |
| 2 | 115 | 116 |
| 3 | 145 | 147 |
| 4 | 179 | 181 |

After the 4 hours of addition, the product was filtered, washed and then dried at 100° C. The average particle size of the product was determined to be 5.2 μm. X-ray diffraction analysis showed the product to be X zeolite with no crystalline impurities. Finally, chemical analysis showed the Si/Al$_2$ ratio to be 2.1.

EXAMPLE 2

Zeolite X seed crystals were prepared as in example 1. To a 10 L vessel there were added 3040 g of a 15 wt. % solution and 720 g of the seed crystals, which was then heated to 90° C. with stirring. The contents of the vessel were continuously withdrawn from a port in the bottom of the vessel, pumped at a rate of 1.6 L/min through a high shear mixer operating at 6,000 rpm and returned to the vessel via a port in the top of the vessel. Sodium silicate and sodium aluminate were continuously added to the vessel at continually increasing rates as shown below.

| Time (hr) | Silicate feed rate (mL/hr) | Aluminate feed rate (mL/hr) |
|---|---|---|
| 0 | 1435 | 1500 |
| 0.27 | 2058 | 2080 |
| 0.47 | 2559 | 2585 |
| 0.64 | 3025 | 3056 |
| 0.78 | 3434 | 3469 |
| 0.91 | 3821 | 3860 |
| 1.00 | 4125 | 4168 |

At the end of the addition, the product was filtered, washed and then dried at 100° C. The average particle size of the product was determined to be 10.8 μm. X-ray diffraction analysis showed the product to be zeolite X with no crystalline impurities. Finally, chemical analysis showed the Si/Al$_2$ ratio to be 2.1.

EXAMPLE 3

Mordenite seed crystals having an average particle size of 1.2 μm were prepared by conventional technique. To a 2L autoclave there were added 320.3 g of deionized water, 5.0 g NaOH pellets, 174.7 g of sodium silicate solution and 60 g of mordenite seed crystals. The autoclave was pressurized to 125 psig with air, stirred at 1,000 rpm and heated to 125° C. Aqueous solutions of sodium silicate, sodium aluminate and sulfuric acid (96% H$_2$SO$_4$) were added, using an air shrouded line, at continually increasing rates as shown below.

| Time (hr) | Silicate feed rate (mL/hr) | Aluminate feed rate (mL/hr) | H$_2$SO$_4$ feed rate (mL/hr) |
|---|---|---|---|
| 0 | 24.1 | 3.3 | 2.0 |
| 1.5 | 27.9 | 3.8 | 2.3 |
| 3.0 | 31.9 | 4.4 | 2.7 |
| 4.5 | 36.2 | 5.0 | 3.0 |
| 6.0 | 40.8 | 5.6 | 3.4 |

After six hours of addition, the product was cooled, filtered, washed with water and dried at 100° C. X-ray powder diffraction analysis showed the product to be fully crystallized mordenite with no crystalline impurities. The particle size was found to be 2.2 μm.

EXAMPLE 4

To a 2L autoclave there were added 354.2 g of deionized water, 58.8 g of tetrapropylammonium bromide, 256.0 g of 40 wt. % tetrapropylammonium hydroxide, 110.5 g of tetraethylorthosilicate and 1.0 g of silicalite seed crystals having an average crystal size of 0.5 μm. The autoclave was sealed and heated to 170° C. while stirring at 250 rpm. A mixture of 702.3 colloidal silica (Ludox® LS30) and 37.7 g of 40 wt. % tetrapropylammonium hydroxide were added to continually increasing rate as indicated below.

| Time (hr) | Feed Rate (mL/hr) |
|---|---|
| 0 | 11.6 |
| 1 | 46.6 |
| 2 | 104.7 |
| 3 | 186.2 |
| 4 | 290.0 |

After four hours of addition, the product was cooled, separated by centrifugation, washed with water, and dried at 100° C. X-ray powder diffraction analysis showed the product to be fully crystallized silicalite with no crystalline impurities. The particle size was found to be 4.8 μm.

We claim as our invention:

1. A process for synthesizing a molecular sieve having a three dimensional microporous framework structure and a framework composition represented by an empirical formula of:

$(Al_xSi_{1-x})O_2$ where Al and Si are framework elements present as tetrahedral oxide units, x has a value from 0 to about 0.5; the process comprising providing a slurry of seed crystals at reaction conditions; adding to the slurry nutrient(s), to provide framework element(s) of the seed crystals thereby growing the seed crystals; carrying out the addition at a rate that essentially equals the crystal growth rate and for a time sufficient to produce the molecular sieve.

2. The process of claim 1 where the reaction conditions include a temperature of about 20° C. to about 250° C. and autogenous pressure.

3. The process of claim 1 where the molecular sieve has a structure selected from the group consisting of zeolite A, zeolite X, mordenite, silicalite, zeolite beta, zeolite Y, zeolite L, ZSM-12, UZM-4 and UZM-5.

4. The process of claim 1 where the nutrient(s) are continuously added.

5. The process of claim 1 where the nutrient(s) are intermittently added.

6. The process of claim 1 where the nutrient(s) are selected from the group consisting of 1) a silicon source and 2) an aluminum source and a silicon source.

7. The process of claim 6 where the aluminum source is selected from the group consisting of sodium aluminate, colloidal alumina, alumina sol, pseudoboehmite, aluminum alkoxides and mixtures thereof.

8. The process of claim 6 where the silicon source is selected from the group consisting of sodium silicate, fumed silica, silica gel, silica sol, silicon alkoxide and mixtures thereof.

9. The process of claim 6 where the nutrients comprise a silicon and an aluminum source and are simultaneously added.

10. The process of claim 6 where the nutrients comprise a silicon and an aluminum source and are sequentially added.

11. The process of claim 1 where additional seed crystals are added to the slurry.

12. A process for synthesizing a molecular sieve having a three dimensional microporous framework structure and a framework composition represented by an empirical formula of:

$$(El_wAl_xP_{y'}Si_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising providing a slurry of seed crystals at reaction conditions; adding to the slurry nutrients to provide; framework elements of the seed crystals thereby growing the seed crystals; carrying out the addition at a rate that essentially equals the crystal growth rate and for a time sufficient to produce the, molecular sieve.

13. The process of claim 12 where El is selected from the group consisting of Mg, Ni, As, Ga, Ge, Mn, Co, Sn, Ti, Fe, Cr, Be, B, Li, V, Zn and mixtures thereof.

14. The process of claim 12 where the reaction conditions include a temperature of about 20° C. to about 250° C. and autogenous pressure.

15. The process of claim 12 where the nutrients are continuously added.

16. The process of claim 12 where the nutrients are intermittently added.

17. The process of claim 12 where the nutrients are selected from the group consisting of 1) an aluminum and a phosphorus source; 2) an aluminum, a silicon and a phosphorus source; 3) an El source, an aluminum source and a phosphorous source and 4) an El source, an aluminum source, a phosphorus source and a silicon source.

18. The process of claim 17 where the aluminum source is selected from the group consisting of sodium aluminate, colloidal alumina, alumina sol, pseudoboehmite, aluminum alkoxides and mixtures thereof.

19. The process of claim 17 where the silicon source is selected from the group consisting of sodium silicate, fumed silica, silica gel, silica sol, colloidal silica, silicon alkoxides and mixtures thereof.

20. The process of claim 12 where the nutrients are simultaneously added.

21. The process of claim 12 where the nutrients are sequentially added.

22. The process of claim 12 where additional seed crystals are added to the slurry.

23. A process for synthesizing a microporous molecular sieve having a three dimensional structure comprising a core molecular sieve and an outer molecular sieve, both molecular sieves having the same framework structure, the core molecular sieve having a composition represented by an empirical formula of $$(Al_xSi_{1-x})O_2$$

where Al and Si are framework elements, present as tetrahedral oxide units, and x has a value from 0 to about 0.5; the process comprising providing a slurry of crystals of the core molecular sieve at reaction conditions; adding to the slurry nutrients to provide framework elements, thereby growing an outer molecular sieve over the seed crystals, the outer molecular sieve having the same framework structure as the core molecular sieve but the core and outer molecular sieve differing by at least one framework element, the outer molecular sieve having a composition represented by the empirical formula:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

24. The process of claim 23 where El is selected from the group consisting of Mg, Ni, As, Ga, Ge, Mn, Co, Sn, Ti, Fe, Cr, Be, B, Li, V, Zn and mixtures thereof.

25. The process of claim 23 where the reaction conditions include a temperature of about 20° C. to about 250° C. and autogenous pressure.

26. The process of claim 23 where the molecular sieve has a framework structure selected from the group consisting of zeolite A, zeolite X, mordenite, silicalite, zcolite beta, zeolite Y, zeolite L, ZSM-12, UZM-4, UZM-5, SAPO-34, SAPO-11 and MAPSO-31.

27. The process of claim 23 where the nutrients are continuously added.

28. The process of claim 23 where the nutrients are simultaneously added.

29. The process of claim 23 where the nutrients are sequentially added.

30. The process of claim 23 where the nutrients are intermittently added.

31. The process of claim 23 where the nutrients arm selected from the group consisting of: 1) a silicon source; 2) an aluminum and a silicon source; 3) a phosphorus, an aluminum and a silicon source; 4) a phosphorus and an aluminum source; 5) an El source, an aluminum source and a phosphorus source and 6) an El source, an aluminum source, a phosphorus source and a silicon source.

32. The process of claim 23 where additional seed crystals are added to the slurry.

33. A process for synthesizing a microporous molecular sieve having a three dimensional structure comprising a core molecular sieve and an outer molecular sieve, both molecular sieves having the same framework structure, the core molecular sieve having a composition represented by an empirical formula of:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, y' is the mole fraction of P and has a value from greater than 0 to about 0.5, and "z" is the mole fraction of Si and has a value from 0 to about 0.98, w+x+y'+z=1, the process comprising providing a slurry of crystals of the core molecular sieve at reaction conditions; adding to the slurry nutrients to provide framework elements thereby growing an outer molecular sieve over the crystals, the outer molecular sieve having the same framework structure as the core molecular sieve, but the core and outer molecular sieve differing by at least one framework element, the outer molecular sieve having a composition represented by the empirical formula:

$$(El_wAl_xP_ySi_z)O_2$$

where El, Al, P and Si are framework elements present as tetrahedral oxide units, "w" is the mole fraction of El and has a value from zero to about 0.5, "x" is the mole fraction of Al and has a value from 0 to about 0.5, "y" is the mole fraction of P and has a value from 0 to about 0.5, and "z" is the mole fraction of Si and has a value from 0 to about 1, w+x+y+z=1 and "y" and "z" are not simultaneously zero; carrying out the addition at a rate that essentially equals the growth rate of the outer molecular sieve and for a time sufficient to produce the molecular sieve.

34. The process of claim 33 where El is selected from the group consisting of Mg, Ni, As, Ga, Ge, Mn, Co, Sn, Ti, Fe, Cr, Be, B, Li, V, Zn and mixtures thereof.

35. The process of claim 33 where the reaction conditions include a temperature of about 20° C. to about 250° C. and autogenous pressure.

36. The process of claim 33 where the molecular sieve has a framework structure selected from the group consisting of zeolite A, zeolite X, mordenite, silicalite, zeolite beta, zeolite Y, zeolite L, ZSM-12, UZM-4, UZM-5, SAPO-34, SAPO-11 and MAPSO-31.

37. The process of claim 33 where the nutrients are continuously added.

38. The process of claim 33 where the nutrients are intermittently added.

39. The process of claim 33 where the nutrients arm simultaneously added.

40. The process of claim 33 where the nutrients am sequentially added.

41. The process of claim 33 where the nutrients are selected from the group consisting of: 1) a silicon source; 2) an aluminum and a silicon source; 3) a phosphorus, an aluminum and a silicon source; 4) a phosphorus and an aluminum source; 5) an El source, an aluminum source and a phosphorus source and 6) an El source, an aluminum source, a phosphorus source and a silicon source.

42. The process of claim 33 where additional seed crystals are added to the slurry.

* * * * *